(12) United States Patent
Ryu et al.

(10) Patent No.: US 11,622,335 B2
(45) Date of Patent: Apr. 4, 2023

(54) PRIORITY-BASED TRANSMIT POWER CONTROL

(71) Applicant: QUALCOMM Incorporated, San Diego, CA (US)

(72) Inventors: Jung Ho Ryu, Fort Lee, NJ (US); Kapil Gulati, Hillsborough, NJ (US); Junyi Li, Chester, NJ (US); Vasanthan Raghavan, West Windsor Township, NJ (US); Sony Akkarakaran, Poway, CA (US); Tao Luo, San Diego, CA (US); Tianyang Bai, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 16/923,953

(22) Filed: Jul. 8, 2020

(65) Prior Publication Data

US 2021/0037477 A1 Feb. 4, 2021

Related U.S. Application Data

(60) Provisional application No. 62/879,962, filed on Jul. 29, 2019.

(51) Int. Cl.
*H04W 52/14* (2009.01)
*H04W 4/23* (2018.01)
*H04W 4/90* (2018.01)
*H04L 1/00* (2006.01)
*H04W 4/06* (2009.01)
(Continued)

(52) U.S. Cl.
CPC ......... *H04W 52/146* (2013.01); *H04L 1/0003* (2013.01); *H04W 4/06* (2013.01); *H04W 4/23* (2018.02); *H04W 4/90* (2018.02); *H04W 52/242* (2013.01); *H04W 52/28* (2013.01); *H04W 72/0473* (2013.01); *H04W 92/18* (2013.01)

(58) Field of Classification Search
CPC ....... H04W 52/146; H04W 4/06; H04W 4/90; H04W 52/242; H04W 52/28; H04W 72/0473; H04L 1/0003
See application file for complete search history.

(56) References Cited

U.S. PATENT DOCUMENTS

2014/0321377 A1\* 10/2014 Ryu .................. H04W 72/1247
370/329
2016/0234656 A1\* 8/2016 Iwai ...................... H04L 12/189
(Continued)

OTHER PUBLICATIONS

3GPP TSG RAN WG1 Ad-Hoc Meeting 1901 R1-1900780 (Year: 2019).\*

(Continued)

*Primary Examiner* — Ricky Q Ngo
*Assistant Examiner* — Stephen N Steiner
(74) *Attorney, Agent, or Firm* — Patterson + Sheridan, LLP

(57) ABSTRACT

Certain aspects of the present disclosure provide techniques for priority-based transmit power control. A method that may be performed by a user equipment (UE) includes communicating with at least a second UE via a link, determining a transmission power for transmitting information via the link based, at least in part, on a priority corresponding to the information, and outputting the information for transmission via the link in accordance with the determined transmission power.

20 Claims, 7 Drawing Sheets

(51) Int. Cl.
*H04W 52/28* (2009.01)
*H04W 72/04* (2009.01)
*H04W 52/24* (2009.01)
*H04W 92/18* (2009.01)
*H04W 72/044* (2023.01)

(56) References Cited

U.S. PATENT DOCUMENTS

2018/0206133 A1* 7/2018 Venkatraman .......... H04L 47/29
2021/0243701 A1* 8/2021 Hong .................. H04W 52/383
2021/0377871 A1* 12/2021 Zhao ................. H04W 72/1263

OTHER PUBLICATIONS

3GPP TSG RAN WG1 Meeting #97 R1-1906008 (Year: 2019).*
Ba X, et al., "User-priority-based Resource Allocation for Device-to-device Communications in 5G Underlaying Cellular Networks", IET Communications, The Institution of Engineering and Technology, GB, vol. 13, No. 8, May 14, (May 14, 2019), pp. 1016-1024, XP006078387, ISSN: 1751-8628, DOI: 10.1049/IET-COM.2018. 5342 abstract paragraph [0003].
Huawei, et al., "CR on UE Overheating Support for NGEN-DC", 3GPP Draft, 3GPP TSG-RAN2 Meeting#105, R2-1901680, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 25, 2019-Mar. 1, 2019, Feb. 15, 2019 (Feb. 15, 2019), XP051603032,4 pages, Retrieved from the Internet: URL: http://www.3gpp.org/ftp/tsg%5Fran/WG2%5FRL2/TSGR2%5F105/Docs/R2%2D1901680%2Ezip [retrieved on Feb. 15, 2019] the whole document.
Huawei, et al., Sidelink Physical Layer Procedures for NK V2X, 3GPH Draft, 3GPP TSG RAN WG1 Meeting #97, R1-1906008, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019,May 13, 2019 (May 13, 2019), XP051727465, 24 pages, Retrieved from the Internet: URL: http://www.3gpp.org/ftp/Meetings%5F3GPP%5FSYNC/RAN1/Docs/R1%2D1906008%2Ezip [retrieved on May 13, 2019] paragraph [05.1]—paragraph [05.3].
International Search Report and Written Opinion—PCT/US2020/041408—ISA/EPO—dated Oct. 26, 2020.
Ohtsuji T., et al., "Device-to-device Relay Selection Based on Effective Path Throughput to Fill Coverage Hole in Public Safety LTE", 2016 International Conference on Information and Communication Technology Convergence (ICTC), IEEE, Oct. 19, 2016 (Oct. 19, 2016), pp. 613-618, XP033015782, DOI:10 1109/ICTC. 2016.7763546 [retrieved on Nov. 30, 2016] abstract paragraph [II. B] figure 3 Formula (1).
Zte et al., "Coexistence Between NR V2X and LTE V2X," 3GPP Draft, 3GPP TSG RAN WG1 Ad-Hoc Meeting 1901, R1-1900780, Coexistence Between NR V2X and LTE V2X, 3rd Generation Parinership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593626, pp. 1-6, Retrieved from the Internet: URL: http://www.3gpp.org/ftp/Meetings%5F3GPP%5FSYNC/RAN1/Docs/R1%2D1900780%2Ezip [retrieved on Jan. 20, 2019].

* cited by examiner

| Priority | Use case Scenarios / Applications | Pathloss Compensation Factor | Pathloss Compensation | Impact |
|---|---|---|---|---|
| High | Public safety, collision warning, notification of emergency vehicle nearby | 1 | Full pathloss compensation | Transmit at high power to reach as many devices as possible |
| Medium | Groupcast, traffic flow management, navigation | 0.5 | Partial | Reach more devices than low priority transmission, may cause some interference to other sidelinks, access links |
| Low | Gaming, vehicle-to-vehicle media content sharing, advertisement, etc. | 0.25 | Low | May be interfered by higher priority transmission, will cause less interference to access links |

FIG. 6

PRIORITY-BASED TRANSMIT POWER CONTROL

CROSS REFERENCE TO RELATED APPLICATION

This Application hereby claims priority under 35 U.S.C. § 119 to U.S. Provisional Patent Application No. 62/879,962, filed on Jul. 29, 2019, the contents of which are incorporated herein in their entirety.

BACKGROUND

Field of the Disclosure

Aspects of the present disclosure relate to wireless communications, and more particularly, to techniques for priority-based transmit power control.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved priority-based transmit power control.

Certain aspects provide a method for wireless communications by a first user equipment (UE). The method generally includes communicating with at least a second UE via a link, determining a transmission power for transmitting information via the link based, at least in part, on a priority corresponding to the information, and outputting the information for transmission via the link in accordance with the determined transmission power.

Certain aspects provide an apparatus for wireless communications by a first user equipment (UE). The apparatus generally includes a processing system configured to communicate with at least a second UE via a link and determining a transmission power for transmitting information via the link based, at least in part, on a priority corresponding to the information. Additionally, the apparatus generally includes an interface configured to output the information for transmission via the link in accordance with the determined transmission power.

Certain aspects provide an apparatus for wireless communications by a first user equipment (UE). The apparatus generally includes means for communicating with at least a second UE via a link, means for determining a transmission power for transmitting information via the link based, at least in part, on a priority corresponding to the information, and means for outputting the information for transmission via the link in accordance with the determined transmission power.

Certain aspects provide a user equipment (UE) for wireless communications. The UE generally includes a processing system configured to communicate with at least a second UE via a link and determining a transmission power for transmitting information via the link based, at least in part, on a priority corresponding to the information. Additionally, the UE generally includes a transmitter configured to output the information for transmission via the link in accordance with the determined transmission power.

Certain aspects provide a non-transitory computer-readable medium for wireless communications by a first user equipment (UE). The non-transitory computer-readable medium generally includes instructions that, when executed by at least one processor, cause the at least one processor to communicate with at least a second UE via a link, determine a transmission power for transmitting information via the link based, at least in part, on a priority corresponding to the information, and output the information for transmission via the link in accordance with the determined transmission power.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 is a table illustrating different priority levels for different types of information, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for priority-based transmit power control. In some cases, the techniques presented herein may be applied to side-link communication links between user equipments (UEs) as well as other communication links, such as access links between a UE and a base station (BS).

The following description provides examples of priority-based transmit power control in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
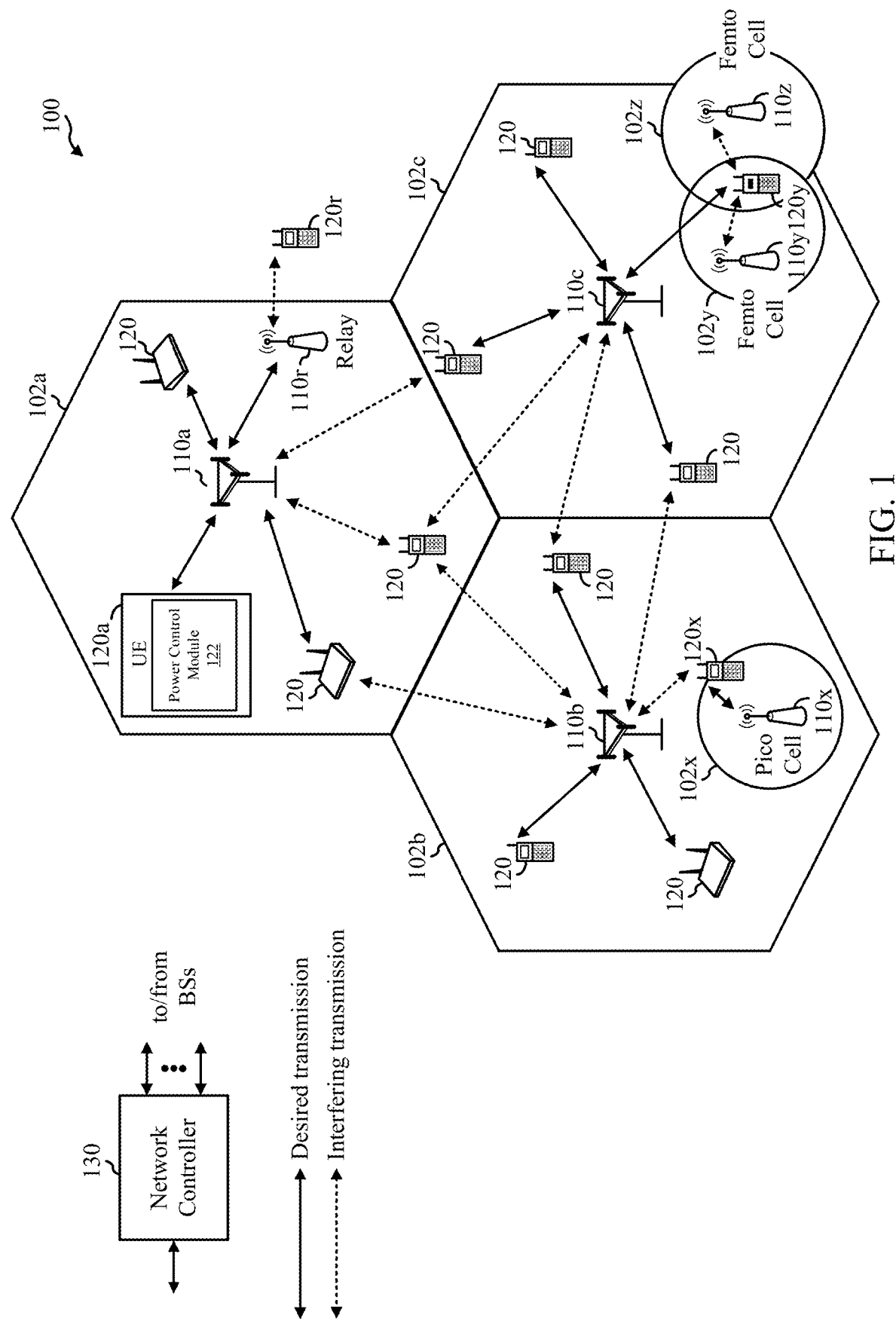
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for priority-based transmit power control. For example, as shown in FIG. 1, the UE 120a includes a power control module 122. The power control module 122 may be configured to communicate with at least a second UE via a link, determine a transmission power for transmitting information via the link based, at least in part, on a priority corresponding to the information, and output the information for transmission via the link in accordance with the determined transmission power, in accordance with aspects of the present disclosure. In some examples, the power control module 122 may select a power control compensation factor based on the priority corresponding to the information and determine the transmission power using the selected power control compensation factor, as described below.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
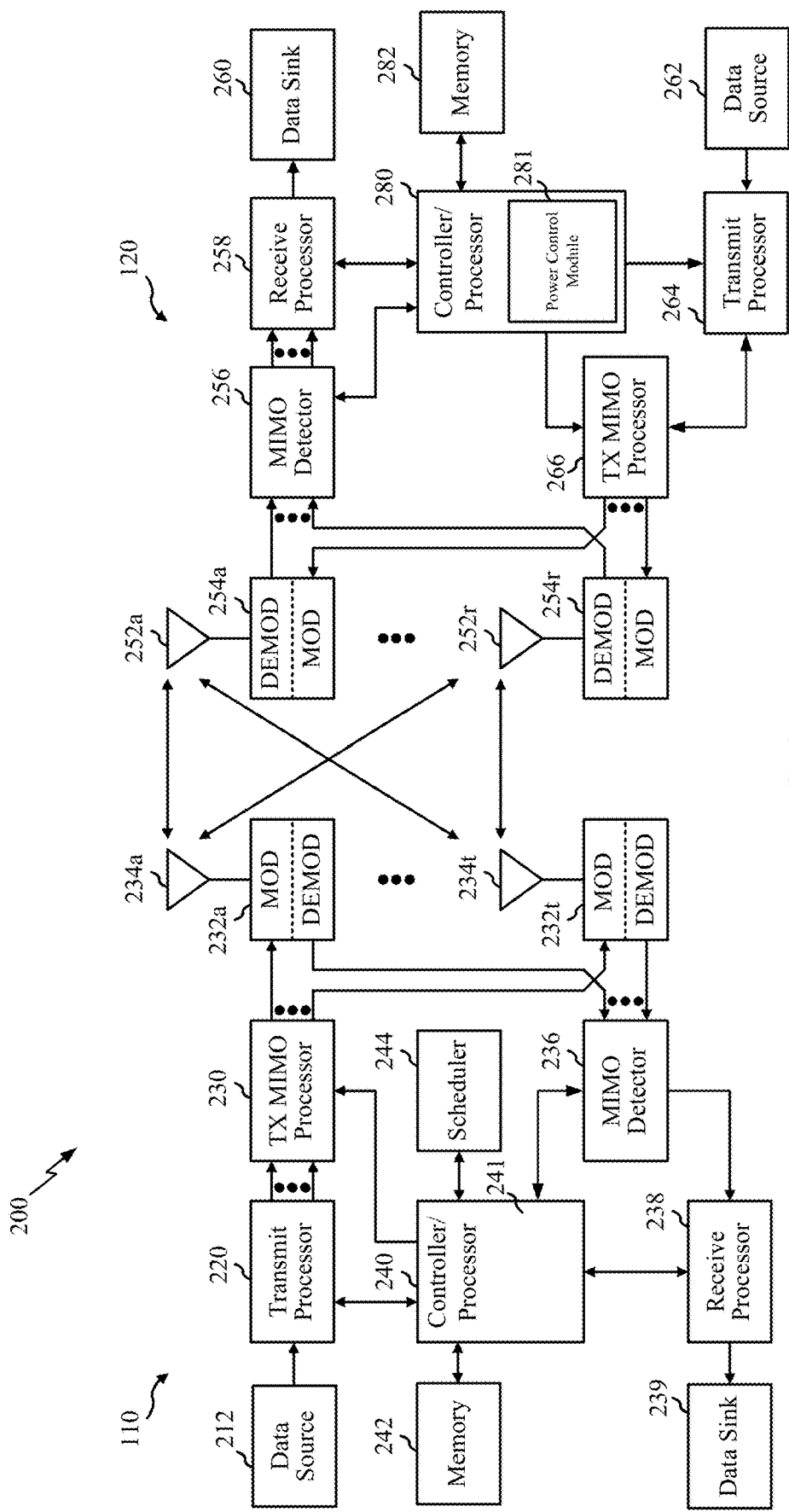
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 280 of the UE 120a may include a power control module 281 that may be configured for priority-based transmit power control, according to aspects described herein. For example, in some cases, the power control module 281 may be configured to communicate with at least a second UE via a link, determine a transmission power for transmitting information via the link based, at least in part, on a priority corresponding to the information, and output the information for transmission via the link in accordance with the determined transmission power Although shown at the Controller/Processor, other components of the UE 120a and BS 110a may be used performing the operations described herein.

Example Priority-Based Transmit Power Control

Figure 3:
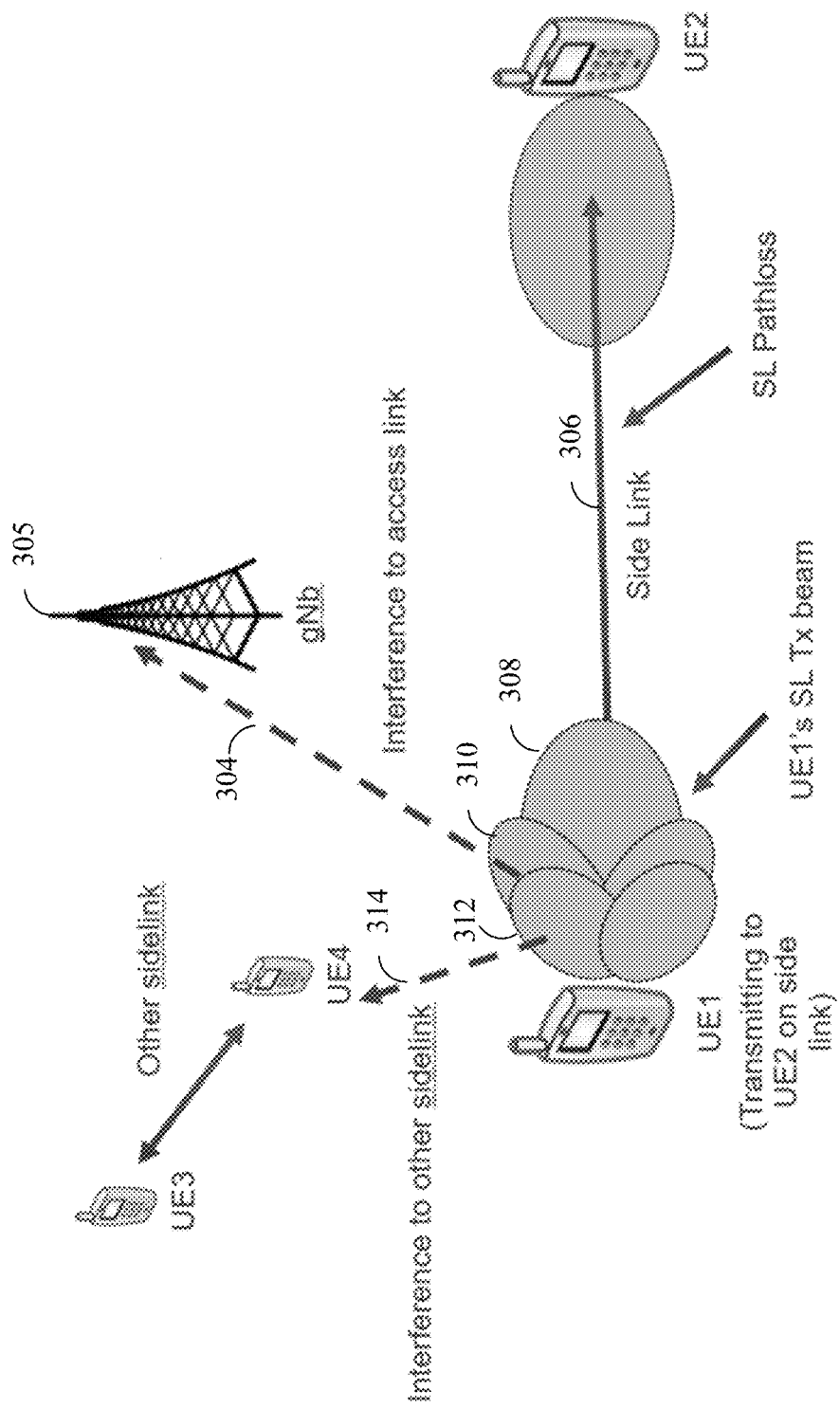
FIG. 3 illustrates an exemplary wireless communication network, in accordance with certain aspects of the present disclosure.

In certain wireless communication networks, such as the wireless communication network 100, a user equipment (UE) may communicate with different nodes in the wireless communication network using various communication links. For example, in some cases, as illustrated in FIG. 3, UE1 may communicate one or more base stations 305 (e.g., gNBs) in the network using one or more access-links 304. Additionally, in some cases, UE1 may communicate (e.g., directly) with one or more other UEs (e.g., UE2) via one or more side-links 306.

In some cases, when UEs transmit to each other on the side-link, these UEs may need to take in to consideration the interference that the sidelink transmissions can cause on the access links or other side-links in the wireless communication network. For example, as illustrated in FIG. 3, UE1 may communicate with UE2 via side-link 306 using one or more transmission beams, such as main lobe 308. However, as illustrated, during transmission other side lobes may radiate power in directions other than towards the UE2, potentially causing interference to other side-links and access-links in the wireless communication network. For example, as illustrated, during transmission on side-link 306, side lobes 310 and 312 may radiate power in a direction other than towards UE2, causing interference to access link 304 and side-link 314, respectively.

Thus, as noted above, when transmitting on a side-link, a UE may take into consideration the interference that the sidelink transmissions can cause on the access links or other side-links. In some cases, to reduce interference that side-link transmissions can cause on the access links or other side-links, a UE may be configured to perform open loop power control to adjust the transmission power of the side-link transmissions, taking into account a priority associated with the information to be transmitted via the side link. For example, for certain types of information/traffic (e.g., high priority information) transmitted on the side-link it may be permissible to cause interference to other communication links in the wireless communication network as opposed to other types of information (e.g., low priority information).

Thus, aspects of the present disclosure provide techniques for mitigating interference caused by side-link transmissions while also taking into account the priority associated with the information to be transmitted via the side-link. More specifically, aspects of the present disclosure provide techniques for priority-based transmit power control.

Figure 4:
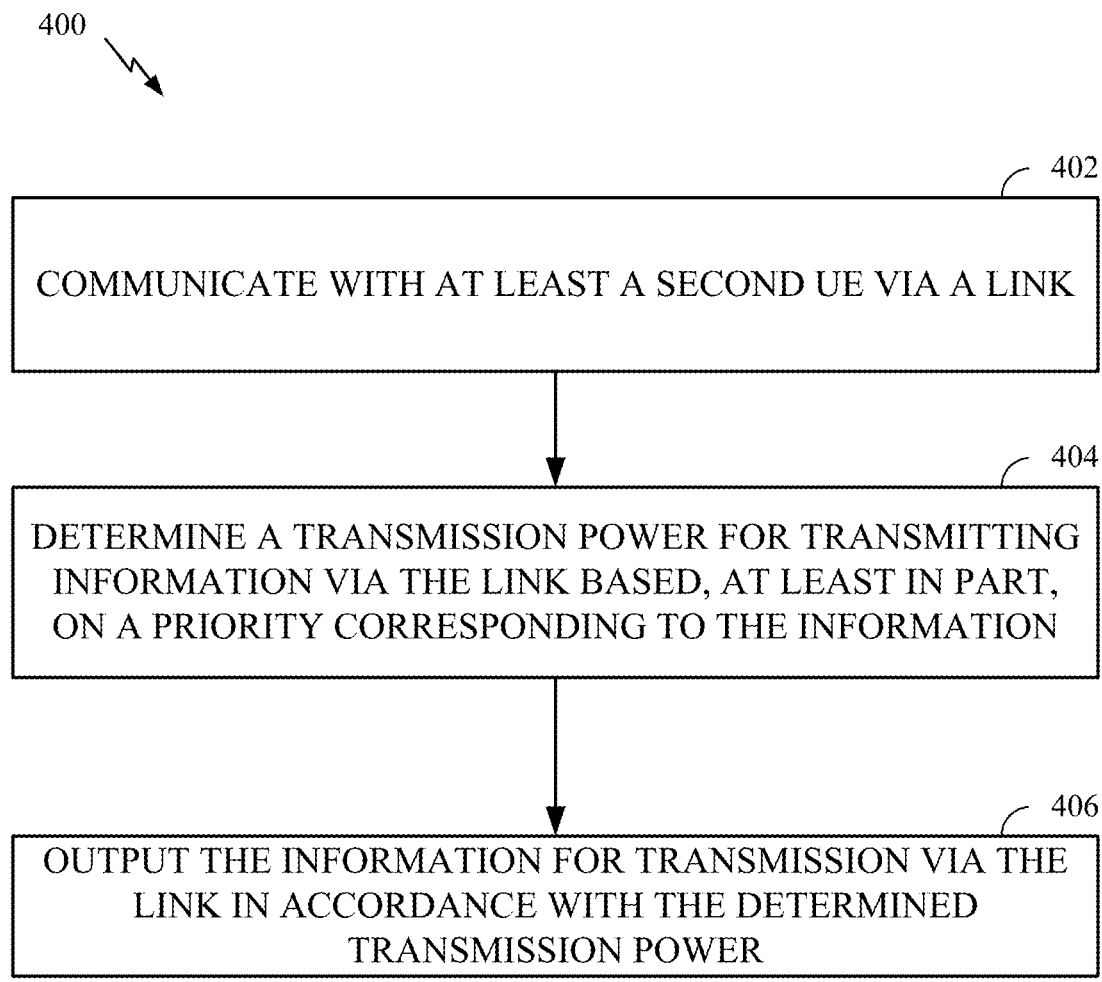
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a first UE (e.g., such as a UE 120a in the wireless communication network 100). Operations 400 may be implemented as software components that are executed and run on a processing system, including one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 402, by communicating with at least a second UE via a link. In some cases, the link may comprise a side-link between the first UE and the second UE. In some cases, communicating with at least the second UE via the link may include establishing the link with the second UE. Additionally, in some cases, the UE may also communicate with one or more base stations via at least one access-link.

At 404, the UE determines a transmission power for transmitting information via the link based, at least in part, on a priority corresponding to the information.

At 406, the UE outputs the information for transmission via the link in accordance with the determined transmission power. Additionally, while not illustrated, operations 400 may also include transmitting the information via the link in accordance with the determined transmission power.

As noted above, aspects of the present disclosure provide techniques for priority-based transmit power control. In certain cases, a UE may already be configured to perform power control on an access link shared between a base station and itself.

Figure 5:
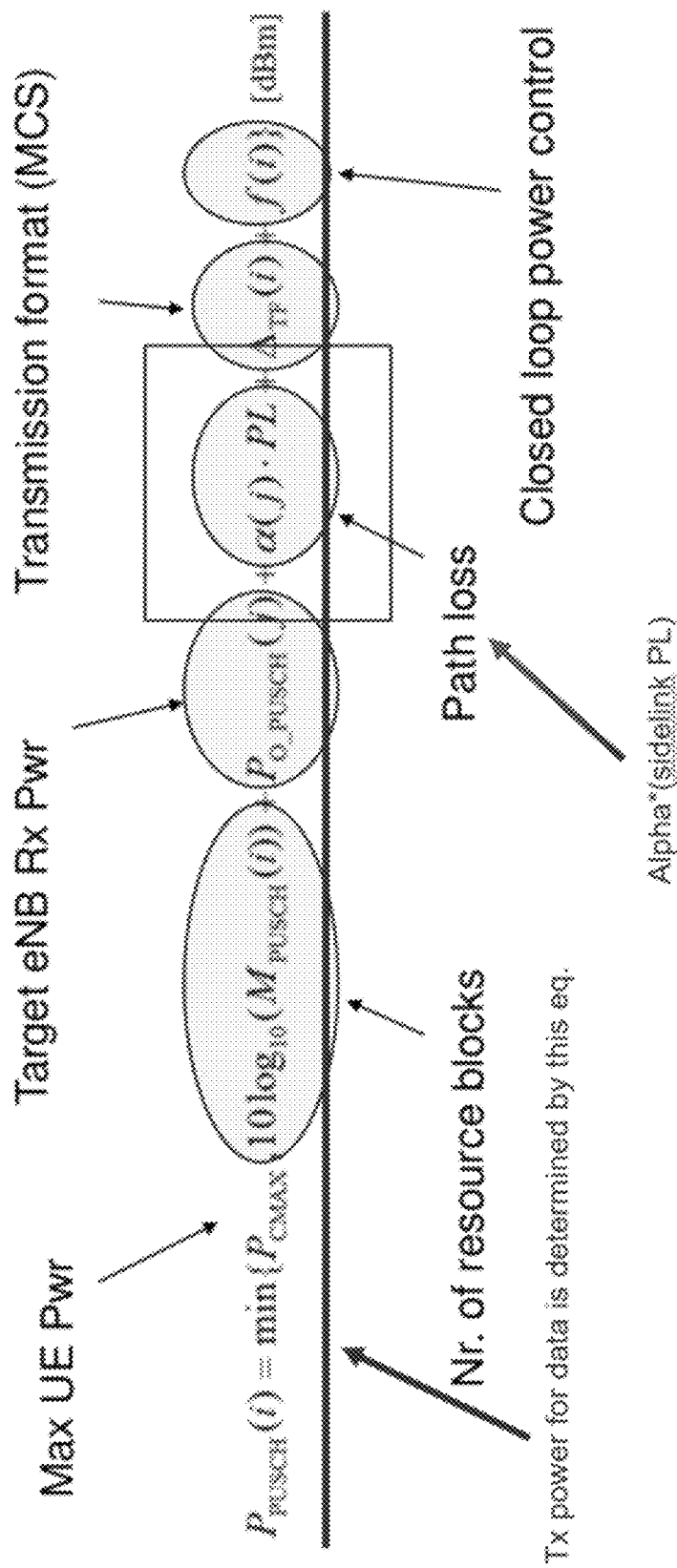
FIG. 5 illustrates an example power control formula, in accordance with certain aspects of the present disclosure.

For example, FIG. 5 illustrates an exemplary access-link power control formula used to determine a transmission power for transmitting information on the access-link. As illustrated, the transmission power for the access link may take into account a plurality of parameters, such as a maximum UE power (e.g., $P_{CMAX}$), a number of resource blocks associated with an uplink channel transmitted on the access link (e.g., $10 \log_{10}(M_{PUSCH}(i))$), a target receive power at the base station (e.g., $P_{O\_PUSCH}$), a path loss associated with the access link (e.g., PL), a power control compensation factor associated with the path loss (e.g., $\alpha(j)$), a transmission formation/modulation and coding scheme (e.g., $\Delta_{TF}(i)$), and closed loop power control (e.g., f(i)). In some cases, the power control compensation factor, alpha ($\alpha$), is introduced to compensate for PL observed on the access-link and may be a value between 0 and 1. For example, in some cases, alpha may be set low if the transmission by the UE cause significant interference to other receivers; otherwise, alpha may be set high to fully compensate for PL.

According to aspects, side-link data packets may have different proximity service (Prose) priority. For example, in some cases, certain data like public safety data have high priority, while other data have low priority. Additionally, in some cases, high priority transmissions like for public safety tend to benefit more users and, thus, may be transmitted at higher power to reach more UEs. According to aspects, the benefit of transmitting a high priority packet at a higher power may be worth the potential increase in interference to other connection links in a wireless communication network. Further, other types of data, such as low-priority data may be transmitted at a lower power so as to reduce interference to other connection links in the wireless communication network.

Thus, as noted above, aspects of the present disclosure provide techniques for determining a transmission power for side-link connections, for example, based, at least in part, on a priority corresponding to information to be transmitted on the side-link connection.

For example, as noted above, a first UE may communicate with at least a second UE via a link, such as a side-link connection. For example, in some cases, the first UE may communicate with the second UE to establish the side-link connection The UE may then determine a transmission power for transmitting information via the link based, at least in part, on a priority corresponding to the information. According to aspects, the UE may then output the information for transmission on the link according to the determined transmission power.

In some cases, the priority corresponding to the information may be based on a type of the information. For example, in some cases, the type of the information comprises at least one of emergency services information or public safety information (or the like). In this case, the priority corresponding to the information may be "high." Further, in some cases, the type of the information comprises at least one of navigation information, group-cast information, or traffic flow management information (or the like). In this case, the priority corresponding to the information may be "medium." Additionally, in some cases, the type of the information comprises at least one of gaming information, media content sharing information, or advertisement information (or the like). In this cases, the priority corresponding to the information may be "low." FIG. 6 illustrates an exemplary table showing different information types and corresponding priorities. Additionally, FIG. 6 shows a power control compensation factor corresponding to the various information types, which is explained in greater detail below.

According to aspects, based on the priority corresponding to the information to be transmitted on the side link, the UE may also select a power control compensation factor (e.g., alpha) and use the power control compensation factor to determine the transmission power (e.g., in some cases, using a transmission power formula similar to FIG. 5). For example, in some cases, the UE may determine that information needs to be transmitted over the side link and may determine a type of the information. Thereafter, based on the determined type of information, the UE may determine the priority corresponding to the information.

Additionally, based on the determined priority, the select an appropriate power control compensation factor to be used when determining the transmission power for transmitting the information via the link. As noted, FIG. 6 illustrates power scaling factors corresponding to different types of information with different priorities. According to aspects, as illustrated, the higher the priority corresponding to the information is the higher the selected power control compensation factor is. For example, as illustrated, high priority information may correspond to a higher power control compensation factor of 1 while low priority information may correspond to a lower power control compensation factor of 0.25. It should be understood that these exact power scaling values are not meant to be restrictive and are meant only for illustrative purposes.

In some cases, selection of the power control compensation factor may also be based on an operating mode of the UE, such as in coverage mode or out of coverage mode. For example, in some cases, when alpha<1, a modulation and coding scheme (MCS) may be reduced so that the information is transmitted correctly, thus the MCS-related offset in the power-control equation illustrated in FIG. 5 may be 'turned off'. In case of sidelink, if the UE is operating in in coverage mode and gNB controls the side-link MCS then the same can apply (e.g., the MCS-related offset may be "turned off"). However, if the UE is operating in out of coverage mode where the UE controls the sidelink MCS then "turning off" the MCS-related offset may not be needed. Thus, in certain cases, a transmission power cap (e.g., similar txpower effect) could be effectively achieved by using either alpha=1 with much reduced MCS or with alpha<1 with a somewhat reduced MCS. Thus, in certain cases, the selection of the power control compensation factor, alpha, may be based on an operating mode of the UE. Additionally, in some cases, the UE may be further configured to determine a modulation and coding scheme (MCS) based on the operating mode of the UE and the selected power scaling factor. The determined MCS may then also be used for transmitting the information on the link.

Additionally, alpha<1 may imply more and more "deficit in Txpower" (to be made up by reducing MCS) as UE goes towards cell-edge (and is thus more likely to interfere with neighbor cell). However, for the side-link, this increase in "Txpower deficit" happens as the side-link transmitter and receiver get further from each other, which in general is not the same as side-link transmitter getting nearer to cell-edge. So, the fractional alpha scheme may also result in unnecessarily low transmit power if the intent was to reduce the neighbor-cell interference. Thus, the use of the alpha*PL term (e.g., as illustrated in FIG. 5) may also depend on PLs measured to other potential targets (like serving gNB or other sidelink UEs that do not need to receive this side-link transmitter's transmission). Thus, in some cases, selection of the power control compensation factor may be based on/associated with path loss measurements, such as path loss measurements associated with one or more other UEs and one or more base stations, for example, such as illustrated in FIG. 3.

Figure 7:
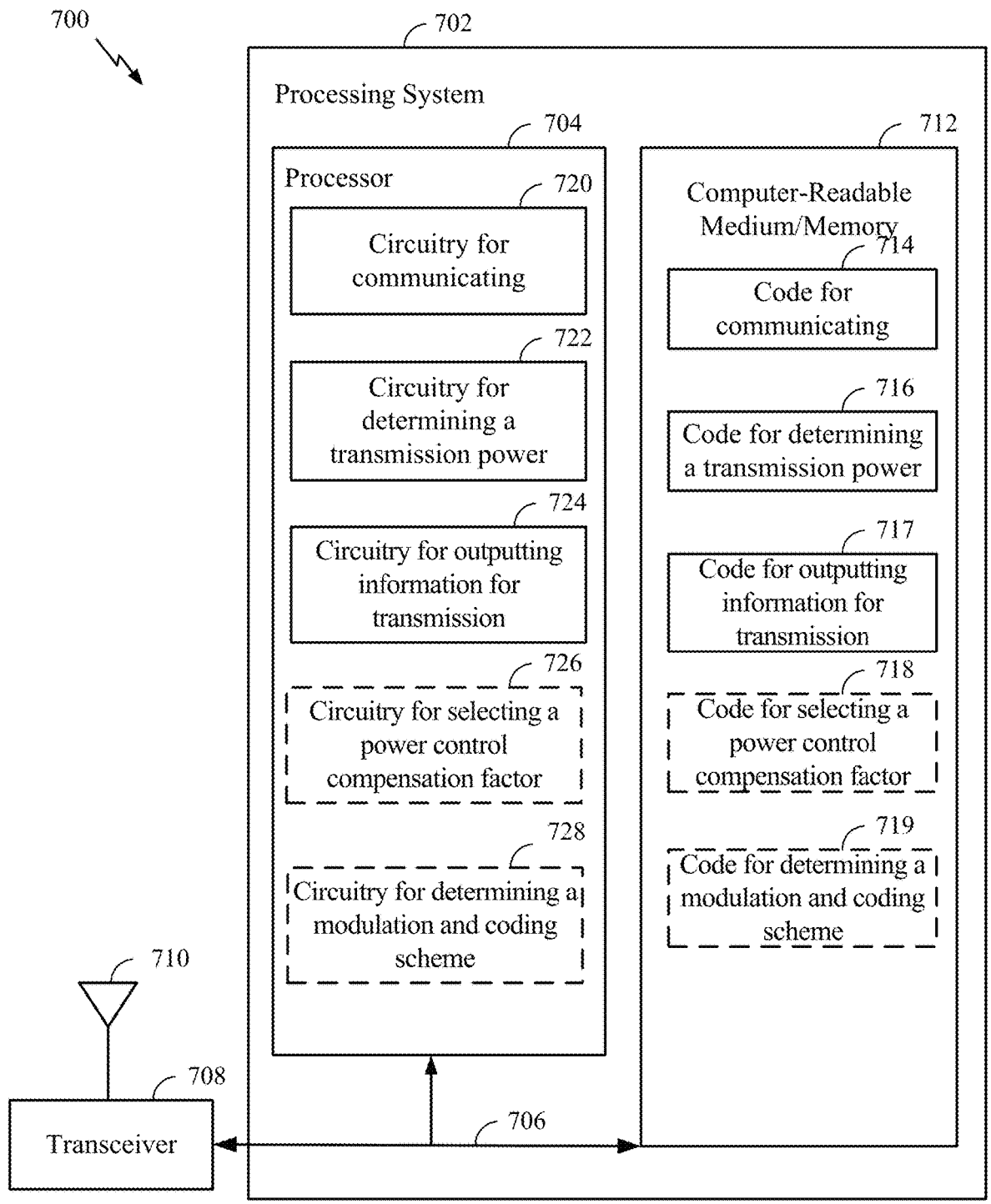
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for priority-based transmit power control. In certain aspects, computer-readable medium/memory 712 stores code 714 for communicating with at least a second UE via a link; code 716 for determining a transmission power for transmitting information via the link based, at least in part, on a priority corresponding to the information; code 717 for outputting the information for transmission via the link in accordance with the determined transmission power; code 718 for selecting a power control compensation factor based on the priority corresponding to the information; and code 719 for determining a modulation and coding scheme (MCS) based on the operating mode of the UE and the power control compensation factor. Additionally, while not illustrated, computer-readable medium/memory 712 may also store code for performing other operations related to priority-based transmit power control described herein. In certain aspects, the processor 704 includes circuitry configured to implement the code stored in the computer-readable medium/memory 712. For example, processor 704 includes circuitry 720 for communicating with at least a second UE via a link; circuitry 722 for determining a transmission power for transmitting information via the link based, at least in part, on a priority corresponding to the information; circuitry 724 for outputting the information for transmission via the link in accordance with the determined transmission power; circuitry 726 for selecting a power control compensation factor based on the priority corresponding to the information; and circuity 728 for determining a modulation and coding scheme (MCS) based on the operating mode of the UE and the power control compensation factor. Additionally, while not illustrated, processor 704 may also include circuitry for performing other operations related to priority-based transmit power control described herein.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a first user equipment (UE), comprising:
a memory comprising computer-executable instructions; and
a processor configured to execute the computer-executable instructions and cause the first UE to:
communicate with at least a second UE via a link; and
determine a transmission power for transmitting information via the link based, at least in part, on a priority corresponding to the information, interference to other side-links and access-links associated with the first UE, and a power control compensation factor selected based on the priority corresponding to the information, wherein the determined transmission power is non-zero; and
transmit the information via the link in accordance with the determined transmission power.

2. The apparatus of claim 1, wherein the priority corresponding to the information is based on a type of the information.

3. The apparatus of claim 2, wherein:
the type of the information comprises at least one of emergency services information or public safety information; and
the priority corresponding to the information is high.

4. The apparatus of claim 2, wherein:
the type of the information comprises at least one of navigation information, group-cast information, or traffic flow management information; and
the priority corresponding to the information is medium.

5. The apparatus of claim 2, wherein:
the type of the information comprises at least one of gaming information, media content sharing information, or advertisement information; and
the priority corresponding to the information is low.

6. The apparatus of claim 1, wherein the processor is further configured to execute the computer-executable instructions and cause the first UE to determine the transmission power by:
selecting the power control compensation factor based on the priority corresponding to the information; and
determining the transmission power using the selected power control compensation factor.

7. The apparatus of claim 6, wherein the higher the priority corresponding to the information is the higher the selected power control compensation factor is.

8. The apparatus of claim 6, wherein the power control compensation factor is selected further based on an operating mode of the UE.

9. The apparatus of claim 8, wherein the processor is further configured to execute the computer-executable instructions and cause the first UE to determine a modulation and coding scheme (MCS) based on the operating mode of the UE and the power control compensation factor, said MCS being used for transmitting the information.

10. The apparatus of claim 6, wherein the power control compensation factor is selected further based on or associated with path loss measurements.

11. The apparatus of claim 10, wherein the path loss measurements are associated with one or more other UEs and one or more base stations.

12. A method for wireless communications by a first user equipment (UE), comprising:
communicating with at least a second UE via a link;
determining a transmission power for transmitting information via the link based, at least in part, on a priority corresponding to the information, interference to other side-links and access-links associated with the first UE, and a power control compensation factor selected based on the priority corresponding to the information, wherein the determined transmission power is non-zero; and outputting the information for transmission via the link in accordance with the determined transmission power.

13. The method of claim 12, wherein the priority corresponding to the information is based on a type of the information.

14. The method of claim 13, wherein:
the type of the information comprises at least one of emergency services information or public safety information and the priority corresponding to the information is high;
the type of the information comprises at least one of navigation information, group-cast information, or traffic flow management information and the priority corresponding to the information is medium; or
the type of the information comprises at least one of gaming information, media content sharing information, or advertisement information and the priority corresponding to the information is low.

15. The method of claim 12, wherein the determination of the transmission power comprises:
selecting the power control compensation factor based on the priority corresponding to the information; and
determining the transmission power using the selected power control compensation factor.

16. The method of claim 15, wherein the higher the priority corresponding to the information is the higher the selected power control compensation factor is.

17. The method of claim 15, wherein the power control compensation factor is selected further based on an operating mode of the UE.

18. The method of claim 17 further comprising:
determining a modulation and coding scheme (MCS) based on the operating mode of the UE and the power control compensation factor, said MCS being used for transmitting the information.

19. The method of claim 15, wherein the power control compensation factor is selected further based on or associated with path loss measurements, said path loss measurements being associated with one or more other UEs and one or more base stations.

20. A non-transitory computer-readable medium comprising computer-executable instructions that, when executed by a processor of a first user equipment (UE), cause the first UE to perform a method of wireless communications, comprising:
communicating with at least a second UE via a link;
determining a transmission power for transmitting information via the link based, at least in part, on a priority corresponding to the information, interference to other side-links and access-links associated with the first UE, and a power control compensation factor selected based on the priority corresponding to the information, wherein the determined transmission power is non-zero; and
transmitting the information via the link in accordance with the determined transmission power.

* * * * *